United States Patent
Makartchouk

(10) Patent No.: US 8,291,696 B2
(45) Date of Patent: Oct. 23, 2012

(54) SCR MIXER

(75) Inventor: Andrei Makartchouk, Hinsdale, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 319 days.

(21) Appl. No.: 12/577,742

(22) Filed: Oct. 13, 2009

(65) Prior Publication Data

US 2011/0083428 A1 Apr. 14, 2011

(51) Int. Cl.
*F01N 3/00* (2006.01)
(52) U.S. Cl. ............... 60/286; 60/274; 60/295; 60/297; 60/301; 60/303; 60/311
(58) Field of Classification Search .............. 60/274, 60/286, 295, 297, 301, 303, 311
See application file for complete search history.

(56) References Cited

U.S. PATENT DOCUMENTS

| 7,509,799 B2 * | 3/2009 | Amou et al. ............... 60/286 |
| 8,037,673 B2 * | 10/2011 | Gonze et al. ............... 60/284 |
| 2008/0087006 A1 | 4/2008 | Wu | |

* cited by examiner

*Primary Examiner* — Thomas Denion
*Assistant Examiner* — Diem Tran
(74) *Attorney, Agent, or Firm* — Mark C. Bach; Jeffrey P. Calfa

(57) ABSTRACT

A device and method for catalytic reduction of NOx in gaseous products of combustion by directing the products of combustion through a particulate filter (32) and then into a mixing zone (28) through separate flow passages (34, 36) at respective velocities greater than that at which products of combustion leave the filter, by causing an injector (38) to introduce urea solution through a nozzle (40) aimed toward the mixing zone along a slant direction (42) to, and across, flow entering the mixing zone through a first (34) of the separate flow passages and ultimately toward a far wall (44) of the mixing zone relative to the nozzle while directing exhaust flow entering the mixing zone through a second (36) of the separate flow passages to enter the mixing zone between the first flow passage and far wall, and by directing flow leaving the mixing zone through an SCR catalyst (48).

8 Claims, 1 Drawing Sheet

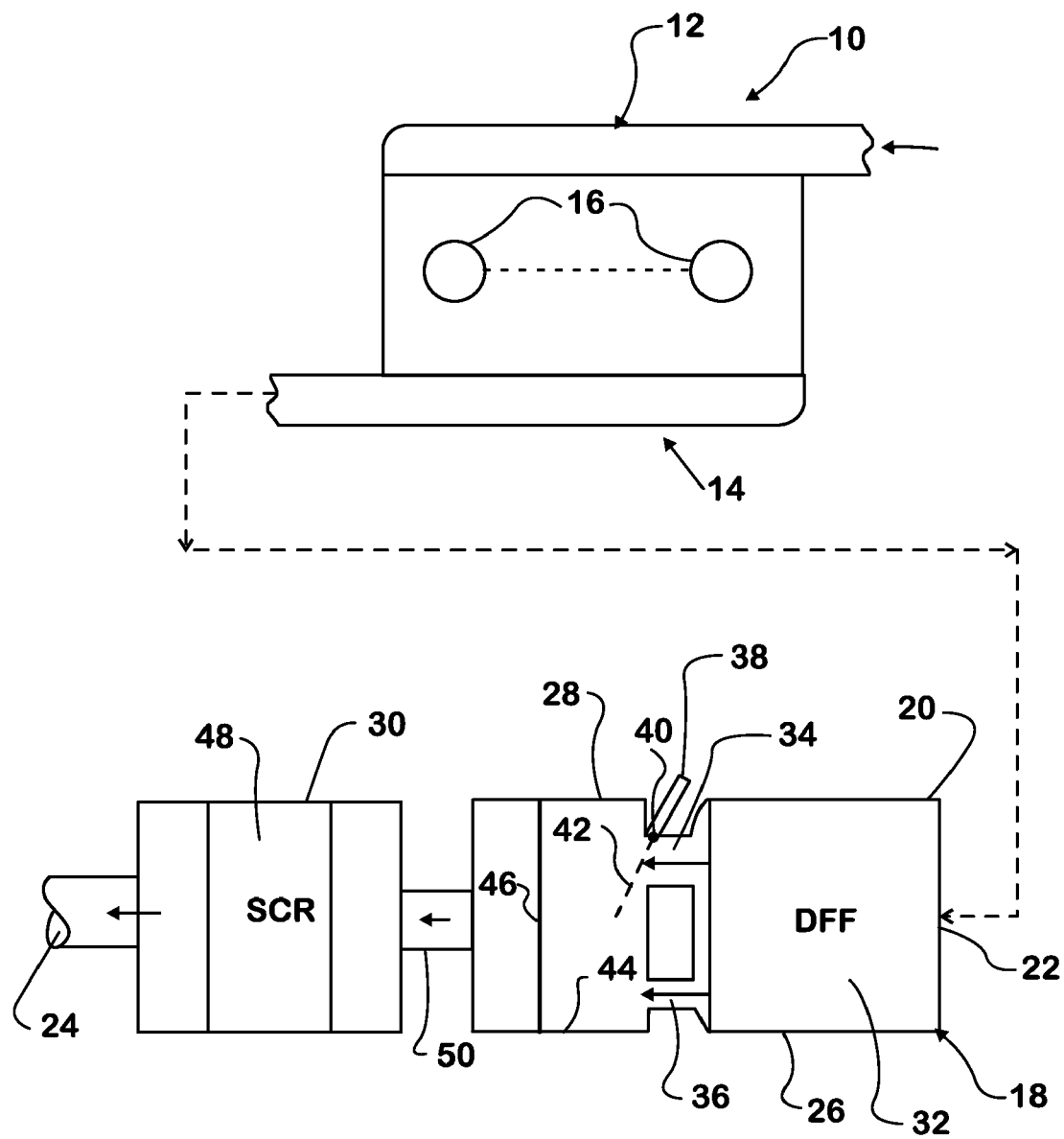

SCR MIXER

FIELD OF THE INVENTION

This invention relates to internal combustion engines, especially diesel engines like those used to propel large trucks, and in particular the invention relates to the treatment of diesel exhaust (sometimes referred to simply as after-treatment or exhaust after-treatment) using a particulate filter, a urea injector and an SCR (selective catalytic reduction) catalyst.

BACKGROUND OF THE INVENTION

In known designs of such an after-treatment system, a urea injector is disposed downstream of a particulate filter to spray urea solution into a mixing zone where the urea is intended to completely evaporate and mix throughly with engine exhaust that has been filtered by the particulate filter. Upon leaving the mixing zone, the mixture is directed across surfaces of an SCR catalyst where oxides of nitrogen (NOx) are chemically reduced via catalytic action.

In one specific design of such an after-treatment system, the injector nozzle is aimed at a right angle to the direction of exhaust flow to direct the injected urea solution across the entire exhaust flow entering the mixing zone, with the nozzle being disposed at one wall, specifically a top wall and aimed toward an opposite wall, specifically a bottom wall. The inventor has observed that this specific design has a tendency to form crystalline urea deposits on a bottom wall of the mixing zone and on the surface of a boss where the urea injector is mounted. The accumulation of such deposits is undesirable.

SUMMARY OF THE INVENTION

The present invention provides a solution for mitigating the accumulation of crystalline urea on surfaces of the mixing zone through a novel organization and arrangement of how the filtered exhaust flow is conveyed into the mixing zone and of how the urea solution is injected in relatation to that flow.

Briefly, the invention provides for exhaust that has been filtered by a particulate filter to flow through separate passages entering the mixing zone, such as through an upper pipe providing an upper passage and through a lower pipe providing a lower passage. The transverse cross sectional areas of the respective passages are chosen to accelerate the exhaust flow leaving the particulate filter, with the lower passage preferably having a smaller transverse cross sectional area than the upper passage so that the flow that it conveys into the mixing zone enters the mixing zone at a greater velocity that the flow entering the mixing zone through the upper passage.

A urea injector is disposed to direct injected urea solution across the flow entering the mixing zone through the upper passage in a slant direction toward the mixing zone. The energy of the accelerated flow through the upper passage tends to direct the injected urea solution more favorably with the direction of exhaust flow through the mixing zone toward the SCR catalyst with the objective of avoiding any significant wetting of the bottom wall. The energy of the even more accelerated flow entering the mixing zone through the lower passage tends to disperse and carry away urea solution that does approach or actually reach the bottom wall.

The energy in the flow through the upper passage also mitigates the accumulation of urea deposits on the surface of the mounting boss in the top wall where the injector is mounted.

A general aspect of the invention relates to an internal combustion engine comprising an exhaust system through which exhaust gas created by combustion in engine combustion chambers passes to atmosphere and which comprises an after-treatment device that treats the exhaust gas before the exhaust gas leaves the exhaust system.

The after-treatment device comprises an inlet through which exhaust gas enters the device, a particulate filter disposed between the inlet and a mixing zone, and a catalyst disposed between the mixing zone and an outlet through which exhaust gas that has passed through the device exits the device for enabling catalytic reaction that treats the exhaust gas.

Exhaust gas that has been filtered by the particulate filter enters the mixing zone through separate flow passages at respective velocities that are greater than a velocity at which the exhaust gas leaves the particulate filter.

An injector for injecting material useful in accomplishing treatment of the exhaust gas into the exhaust gas comprises a nozzle aimed toward the mixing zone along a slant direction to, and across, flow entering the mixing zone through a first of the separate flow passages and ultimately toward a far wall of the mixing zone relative to the nozzle.

The exhaust flow entering the mixing zone through a second of the separate flow passages enters the mixing zone between the first flow passage and the far wall.

Another general aspect relates to an after-treatment device for treating engine exhaust gas passing through the device and comprising an inlet through which exhaust gas enters the device, a particulate filter disposed between the inlet and a mixing zone, and an SCR catalyst disposed between the mixing zone and an outlet through which exhaust gas that has passed through the device exits the device.

Exhaust gas that has been filtered by the particulate filter enters the mixing zone through separate flow passages at respective velocities that are greater than a velocity at which the exhaust gas leaves the particulate filter.

A urea injector for injecting urea solution into the exhaust gas comprises a nozzle aimed toward the mixing zone along a slant direction to, and across, flow entering the mixing zone through a first of the separate flow passages and ultimately toward a far wall of the mixing zone relative to the nozzle.

Exhaust flow entering the mixing zone through a second of the separate flow passages enters the mixing zone between the first flow passage and the far wall.

Still another general aspect relates to a method for catalytic reduction of NOx in gaseous products of combustion from an internal combustion engine by directing the products of combustion to flow through a particulate filter and then into a mixing zone through separate flow passages at respective velocities that are greater than a velocity at which the filtered products of combustion leave the particulate filter, by causing an injector to introduce a reductant, such as urea solution, through a nozzle aimed toward the mixing zone along a slant direction to, and across, flow entering the mixing zone through a first of the separate flow passages and ultimately toward a far wall of the mixing zone relative to the nozzle while directing flow entering the mixing zone through a second of the separate flow passages to enter the mixing zone between the first flow passage and the far wall, and by directing flow leaving the mixing zone through an SCR catalyst where catalytic reduction of NOx occurs.

The foregoing, along with further features and advantages of the invention, will be seen in the following disclosure of a presently preferred embodiment of the invention depicting the best mode contemplated at this time for carrying out the invention. This specification includes drawings, now briefly described as follows.

BRIEF DESCRIPTION OF THE DRAWINGS

FIG. 1 is a diagram that shows a presently preferred embodiment of after-treatment system in accordance with principles of the present invention.

DESCRIPTION OF THE PREFERRED EMBODIMENT

FIG. 1 shows an example of a turbocharged diesel engine 10 having an intake system 12 through which charge air enters and an exhaust system 14 through which exhaust gas resulting combustion exits, not all details of those two systems that are typically present being shown. Engine 10 comprises a number of cylinders 16 forming combustion chambers into which fuel is injected by fuel injectors to combust with the charge air that has entered through intake system 12. Energy released by combustion powers the engine via pistons connected to a crankshaft.

When used in a motor vehicle, such as a truck, engine 10 is coupled through a drive train to driven wheels that propel the vehicle. Intake valves control the admission of charge air into cylinders 16, and exhaust valves control the outflow of exhaust gas through exhaust system 14 and ultimately to atmosphere. Before entering the atmosphere however, the exhaust gas is treated by one or more after-treatment devices in an after-treatment system 18.

The after-treatment system is constructed and arranged to flow the engine exhaust through an after-treatment device 20 that has an exhaust gas inlet 22 through which exhaust gas from cylinders 16 enter the device. Device 20 may be considered to comprise three zones in succession along a flow path for the engine exhaust between inlet 22 and an outlet 24. They are a particulate filter zone 26, a mixing zone 28, and a catalytic zone 30.

A diesel particulate filter (DPF) 32 is disposed within zone 26 to filter the entering exhaust gas. The particular construction of DPF 32 employs any available technology appropriate for trapping certain constituents in diesel exhaust gas, a principal one of which is soot. Furthermore, the filter can be fully or partially coated with oxidation catalyst that oxidizes hydrocarbons and the soluble organic fraction of diesel soot for any of various purposes such as increasing exhaust gas temperature for filter regeneration, preheating of the SCR catalyst, and oxidizing NO into $NO_2$ in order to a) promote $NO_2$-induced soot oxidation and b) create a NO-to-$NO_2$ ratio favorable for SCR catalyst reaction.

Two separate flow passages, namely an upper passage 34 and a lower passage 36, communicate filter zone 26 to mixing zone 28. The transverse cross sectional areas of the respective passages are chosen to accelerate the exhaust flow leaving filter zone 26. Lower passage 36 preferably has a smaller transverse cross sectional area than upper passage 34 so that the flow that the former passage conveys into the mixing zone enters the mixing zone at a greater velocity that the flow conveyed into the mixing zone through the latter passage.

A urea injector 38 for injecting urea solution into the exhaust gas is mounted at a mounting boss in a wall of device 20. Injector 38 comprises a nozzle 40 aimed toward mixing zone 28 along a slant direction 42 to, and across, the exhaust flow entering the mixing zone through upper passage 34 and ultimately toward a far wall 44 of the mixing zone relative to the nozzle. When injector 38 is operated, it sprays urea solution from nozzle 40, and while the spray may spread out along the slant direction as it leaves the nozzle, essentially all of it enters the mixing zone so that virtually none wets the wall of upper passage 34.

Exhaust flow entering mixing zone 28 through lower flow passage 36 enters the mixing zone between upper flow passage 34 and far wall 44. The energy of the more highly accelerated flow from lower passage 36 tends to disperse and carry away any urea solution that may be approaching or actually have reached wall 44.

An element 46 is disposed within mixing zone 28 for promoting deflection/dispersing/breaking-up of urea droplets and ensuing mixing with the flows entering the mixing zone through passages 34, 36. It is desirable that device 20 promote rapid evaporation of droplets in the urea solution spray and mixing with the exhaust gas flow in order to optimize downstream SCR catalyst performance while preventing liquid urea solution from wetting interior wall surfaces including the entrance face of an SCR catalyst 48 disposed in catalytic zone 30, but it may not always be necessary for mixing zone 28 to contain an element or elements for promoting mixing, such as element 46.

A passage 50 communicates mixing zone 28 with catalytic zone 30. SCR catalyst 48 promotes the reaction of exhaust gas constituents with the decomposition products of urea solution evaporation in mixing zone 28. The catalyst shown is constructed for axial flow and is fit to a side wall of zone 30 so that all flow is constrained to pass across catalytic surfaces.

While a presently preferred embodiment of the invention has been illustrated and described, it should be appreciated that principles of the invention apply to all embodiments falling within the scope of the invention that is generally described as follows.

What is claimed is:

1. An internal combustion engine comprising an exhaust system through which exhaust gas created by combustion in engine combustion chambers passes to atmosphere and which comprises an after-treatment device that treats the exhaust gas before the exhaust gas leaves the exhaust system, wherein the after-treatment device comprises:

an inlet through which exhaust gas enters the device;
a particulate filter disposed between the inlet and a mixing zone;
a catalyst disposed between the mixing zone and an outlet through which exhaust gas that has passed through the device exits the device for enabling catalytic reaction that treats the exhaust gas;
an upper flow passage and a lower flow passage through which exhaust gas that has been filtered by the particulate filter enters the mixing zone at respective velocities that are greater than a velocity at which the exhaust gas leaves the particulate filter; and
an injector for injecting material useful in accomplishing treatment of the exhaust gas into the exhaust gas through a nozzle aimed toward the mixing zone along a slant direction to, and across, flow entering the mixing zone through the upper flow passage and ultimately toward a far wall of the mixing zone relative to the nozzle; and
wherein exhaust flow entering the mixing zone through the lower flow passage enters the mixing zone between the upper flow passage and the far wall, at a velocity higher than the velocity of the exhaust flow through the upper flow passage.

2. An engine as set forth in claim 1 wherein the lower flow passage has a smaller transverse cross sectional area than the upper flow passage for causing the flow through the lower flow passage to have a velocity greater than that of the flow through the upper flow passage.

3. An engine as set forth in claim 1 including an element disposed in the mixing zone for promoting mixing of the injected material with the flows entering the mixing zone through the upper and lower flow passages.

4. An after-treatment device for treating engine exhaust gas passing through the device and comprising:
- an inlet through which exhaust gas enters the device;
- a particulate filter disposed between the inlet and a mixing zone;
- an SCR catalyst disposed between the mixing zone and an outlet through which exhaust gas that has passed through the device exits the device;
- an upper flow passage and a lower flow passage through which exhaust gas that has been filtered by the particulate filter enters the mixing zone at respective velocities that are greater than a velocity at which the exhaust gas leaves the particulate filter;
- a urea injector for injecting urea solution into the exhaust gas through a nozzle aimed toward the mixing zone along a slant direction to, and across, flow entering the mixing zone through the upper flow passage and ultimately toward a far wall of the mixing zone relative to the nozzle; and
- wherein exhaust flow entering the mixing zone through the lower flow passage enters the mixing zone between the upper flow passage and the far wall at a velocity higher than the velocity of the exhaust flow through the upper flow passage.

5. An after-treatment device as set forth in claim 4 wherein the lower flow passage has a smaller transverse cross sectional area than the upper flow passage for causing the flow through the lower flow passage to have a velocity greater than that of the flow through the upper flow passage.

6. An after-treatment device as set forth in claim 4 including an element disposed in the mixing zone for promoting mixing of the injected material with the flows entering the mixing zone through the upper and lower flow passages.

7. A method for catalytic reduction of NOx in gaseous products of combustion from an internal combustion engine, the method comprising:
- directing the products of combustion to flow through a particulate filter and then into a mixing zone through an upper and a lower flow passage at respective velocities that are greater than a velocity at which the filtered products of combustion leave the particulate filter and wherein the products of combustion flow at a greater velocity through the lower flow passage than through the upper flow passage;
- causing an injector to introduce a reductant through a nozzle aimed toward the mixing zone along a slant direction to, and across, flow entering the mixing zone through the upper flow passage and ultimately toward a far wall of the mixing zone relative to the nozzle while directing flow entering the mixing zone through the lower flow passage to enter the mixing zone between the upper passage and the far wall;
- and directing flow leaving the mixing zone through an SCR catalyst where catalytic reduction of NOx occurs.

8. A method as set forth in claim 7 wherein the step of causing an injector to introduce a reductant through a nozzle comprises operating the injector to spray urea solution out of the nozzle.

* * * * *